United States Patent [19]

Kato et al.

[11] Patent Number: 5,197,117
[45] Date of Patent: Mar. 23, 1993

[54] TEXT INFORMATION PROCESSING APPARATUS HAVING PRINTER AND PRINTING DOT SIGNAL GENERATING APPARATUS FOR THE SAME

[75] Inventors: Takeshi Kato, Hitachi; Shouji Saitoh, Takahagi, both of Japan

[73] Assignee: Hitachi, Ltd., Tokyo, Japan

[21] Appl. No.: 723,565

[22] Filed: Jul. 1, 1991

[30] Foreign Application Priority Data

Jul. 6, 1990 [JP] Japan .................................. 2-177421

[51] Int. Cl.⁵ .......................................... G06K 15/00
[52] U.S. Cl. .................................... 395/105; 395/114
[58] Field of Search ............... 395/101, 105, 114, 115, 395/116, 103; 346/154; 358/261.1, 261.2, 467, 444

[56] References Cited

U.S. PATENT DOCUMENTS 4,791,680 12/1988 Yokoe et al. .................... 358/261.1
4,901,248 2/1990 Ueno et al. ......................... 395/114

Primary Examiner—Arthur G. Evans
Attorney, Agent, or Firm—Antonelli, Terry, Stout & Kraus

[57] ABSTRACT

A laser beam printer comprises a frame memory of one page part and a compression means for compressing a dot data in the frame memory. The compression means compresses to make a compressed and encoded data. The laser beam printer comprises further a memory operable for storing dividedly a plural pages part of the compressed and encoded data and an extension means for decoding and extending the encoded data in the memory by synchronizing with a printing timing. The data compression in the frame memory and the decoding/printing of the dot data in the encoded data memory carries out in parallel. A printing in the laser beam printer can be realized at a high speed.

12 Claims, 8 Drawing Sheets

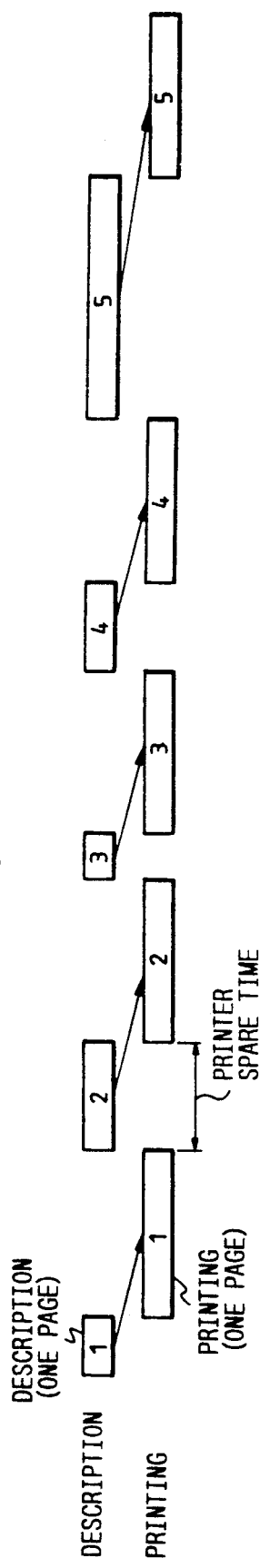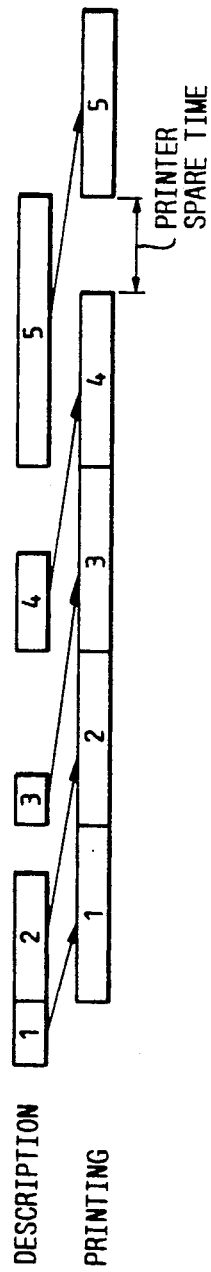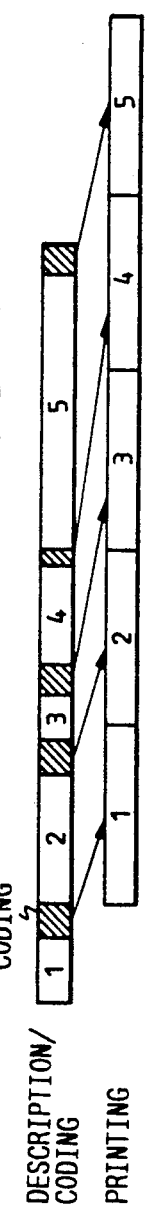

TEXT INFORMATION PROCESSING APPARATUS HAVING PRINTER AND PRINTING DOT SIGNAL GENERATING APPARATUS FOR THE SAME

BACKGROUND OF THE INVENTION

The present invention relates to a text information processing apparatus having a printer and a printing dot signal generating apparatus for the same. The text information processing apparatus comprises a text data preparation means for preparing a text data, a memory means for storing a dot data to be printed, a description means for storing the dot data, and a printer for printing the dot data. The text data includes a format data, a character description data or a figure description data etc. The printer used in the text information processing apparatus employs a laser beam printer using an electronic photography for a page printer.

In a conventional text information processing apparatus in which a text data is prepared and the text data is printed, a laser beam printer utilizing an electronic photographic technique is employed so as to print the text data.

During a printing motion of a dot data of one page part, the laser beam printer requires the dot data within a predetermined period. Further, so as not interrupt the dot data in the way of the printing motion, it needs a construction that before the start of the printing the dot data to be printed of more than one page part is prepared and accumulated in advance.

However, the latest text data includes a figure description data in addition to a character description data, further an outline font and a vector font etc. is used in the text data information apparatus.

In the conventional text data information processing apparatus, the time necessary for developing the text data to the dot data becomes long, further, it requires a memory means having a large store capacity for realizing a high precise. Accordingly, it causes a lowering for printing the dot data and a memory means having a large store capacity for storing the dot data to be printed.

Besides, so as to reduce the store capacity in the memory means, a frame buffer apparatus having a printer is proposed as shown, for example Japanese Patent Laid-Open No. 276559/1988. In this conventional frame buffer apparatus, an input data to be printed is compressed and encoded and the encoded data is stored in a frame memory means, and by decoding or extending this encoded data a dot data is formed, after that this dot data is given into a printer.

However, this conventional frame buffer apparatus is one kind of the frame buffer apparatus for processing an inputted analog video signal. In a case that the data inputted from an upper lank machine is the text data including a character description data and a figure description data, in this frame buffer apparatus it is not attained by an employment of a memory means having less store capacity, further there is no description a rapid development, the store or the description of the dot data and a speedy printing of the dot data. Further, this conventional frame buffer apparatus relates to the processing for the analog video signal as stated above but does not mention with respect to a processing or a treatment for a digital video signal.

SUMMARY OF THE INVENTION

An object of the present invention is to provide a text information processing apparatus having a printer and a printing dot signal generating apparatus for the same wherein a printing of a dot data can be completed within a short time.

Another object of the present invention is to provide a text information processing apparatus having a printer and a printing dot signal generating apparatus for the same wherein a printing of a dot data can carried out efficiently.

A further object of the present invention is to provide a text information processing apparatus having a printer and a printing dot signal generating apparatus for the same wherein a dot data can be developed and stored within a short time.

A further object of the present invention is to provide a text information processing apparatus having a printer and a printing dot signal generating apparatus for the same wherein no spare time occurs in a printer.

A further object of the present invention is to provide a text information processing apparatus having a printer and a printing dot signal generating apparatus for the same wherein using a memory means having a small store capacity a high speed printing control for a dot data can be carried out easily.

In accordance with the present invention, in a text information processing apparatus comprising a text data preparation means for preparing a text data including a character description data and a figure description data, a memory means for storing a dot data to be printed, a description means for developing the text data prepared by the text data preparation means to the dot data to be printed and for storing the dot data to be printed into the memory means, and a printer for printing the dot data stored in the memory means, the processing apparatus characterized of further comprising; a dot data compression means for carrying out a coding processing for compressing a redundancy degree by reading out the dot data to be printed stored in the memory means and for storing the encoded data in the memory means, an encoded data extension means for reading out the encoded data stored in the memory means from the memory means in response to a printing motion of the printer and for carrying out an extension processing for decoding to the dot data, and a dot data output means for giving the dot data prepared by the encoded data extension means to the printer.

In accordance with the present invention, in a text information processing apparatus comprising a text data preparation means for preparing a text data including a character description data and a figure description data, a memory means for storing a dot data to be printed, a description means for developing the text data prepared by the text data preparation means to the dot data to be printed and for storing the dot data to be printed into the memory means, a printer for printing the dot data stored in the memory means, and a control means for controlling these means, the processing apparatus characterized of further comprising; a description processor for developing the text data of one page part to a dot data to be printed of 1/n page part each under a control of the control means and for storing the dot data into the memory means, a dot data compression means for carrying out a coding processing for compressing a redundancy degree by reading out the dot data to be printed of 1/n page part stored in the memory means and for storing the encoded data in the memory means, an encoded data extension means for reading out the encoded data stored in the memory means from the memory means in response to a printing motion of the printer and for carrying out an extension processing for decoding to the dot data, and a dot data output means for giving the dot data prepared by the encoded data extension means to the printer.

In accordance with the present invention, in a printing dot signal generating apparatus comprising a description means for developing a text data including a character description data and a figure description data to a dot data and for storing the dot data into a memory means, and a dot data output means for outputting said dot data stored in the memory means, the signal generating apparatus characterized of further comprising; a dot data compression means for carrying out a coding processing for compressing a redundancy degree by reading out the dot data to be printed stored in the memory means and for storing the encoded data in the memory means, an encoded data extension means for reading out the encoded data stored in the memory means from the memory means in response to a printing motion of the printer and for carrying out an extension processing for decoding to the dot data, and a dot data output means for outputting the dot data prepared by the encoded data extension means as a serial dot data.

In the present invention, the description means develops the inputted text data including the character description data and the figure description data to the dot data and stores the dot data in the memory means. The dot data compression means reads out the dot data stored in the memory means and forms the encoded data for compressing the redundancy degree and stores the encoded data in the memory means. The encoded data extension means reads out the encoded data stored in the memory means and extends the encoded data and further prepares the dot data so as to give to the printer.

According to the present invention, the description means develops the text data, which includes the character description data and/or the figure description data, to the dot data and stores the dot data into the memory means.

The dot data compression means reads out the dot data stored in the memory means. Further, the dot data compression means makes the encoded data for compressing the redundancy degree and stores the encoded data into the memory means. The encoded data extension means reads out the encoded data stored in the memory means and carries out in parallel to the processing for extending to the dot data.

According to the present invention, by utilizing the memory having small memory store capacity the high speed printing in the laser beam printer can be attained.

BRIEF DESCRIPTION OF DRAWINGS

FIG. 9A is a first characteristic view showing a necessary printing processing time according to one conventional text information processing apparatus;

FIG. 9B is a second characteristic view showing a second necessary printing processing time according to another conventional text information processing apparatus; and FIG. 9C is a characteristic view showing a necessary printing processing time in the text information processing apparatus according to the present invention.

DESCRIPTION OF THE INVENTION

One embodiment of a text information processing apparatus and a printing dot signal generating apparatus for the text information processing apparatus according to the present invention will be explained referring to drawings.

Figure 2:
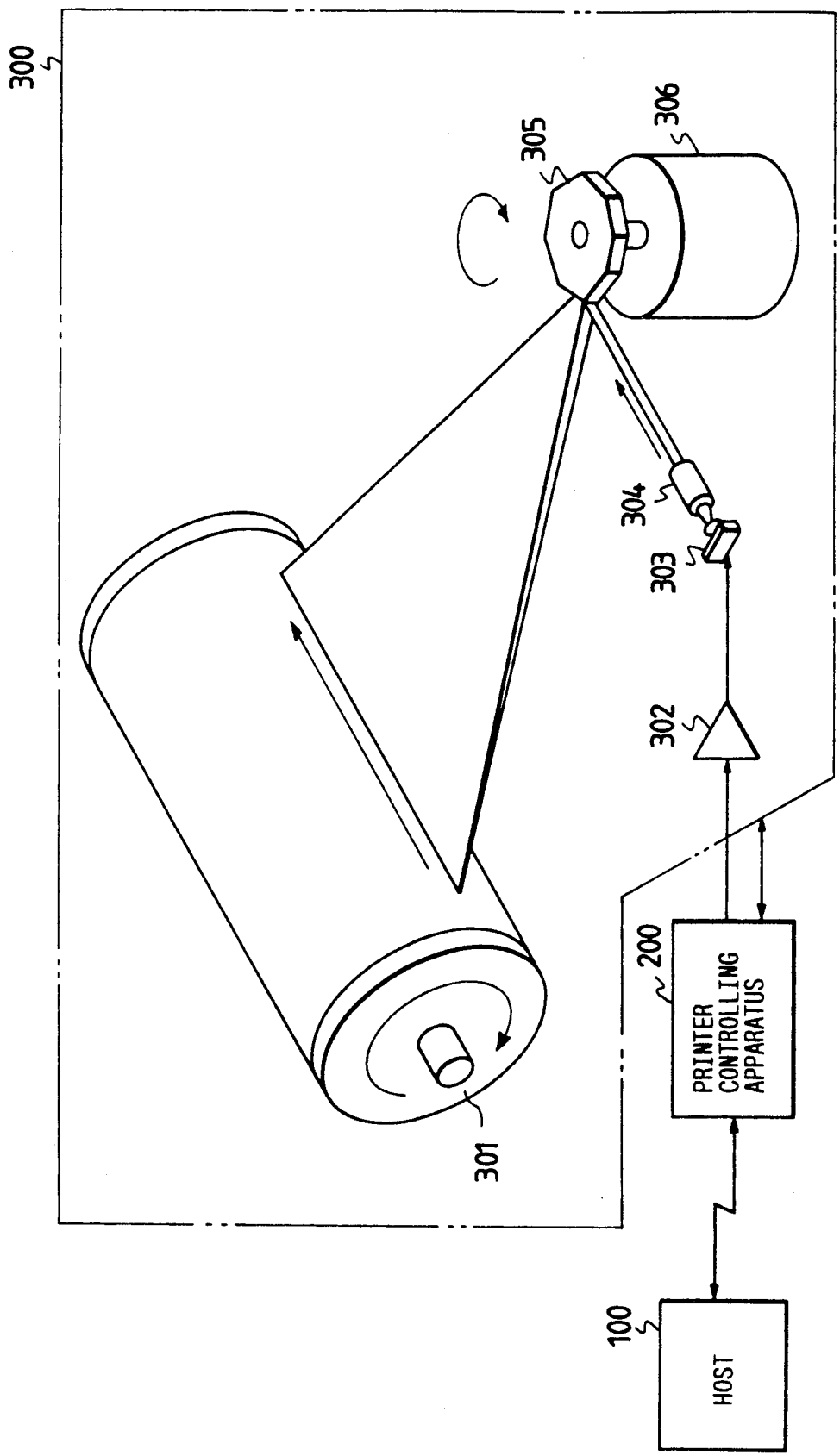
FIG. 2 is a block diagram showing one embodiment of a text information processing apparatus including a laser beam printer structure according to the present invention.

FIG. 2 is a block diagram of a text information processing apparatus according to the present invention, in which a laser beam printer is employed as a printer means for a page printer.

A text information processing apparatus comprises mainly a host 100, a printer controlling apparatus 200, and a laser beam printer 300, as shown in FIG. 2.

The host 100 comprises one of a general-use computer, a personal computer or a word processor etc. The host 100 prepares a text data which includes a format data, a character description data and/or a figure description data. This host 100 gives the text data to be printed to the printer controlling apparatus 200.

The printer controlling apparatus 200 receives the text data from the host 100 and controls the start/stop of the laser beam printer 300. The printer controlling apparatus 200 develops or converts the text data to a dot data necessary for print by the laser beam printer 300. Further, the printer controlling apparatus 200 gives to the laser beam printer 300 as a serial dot data or a video signal in serial in accordance with a printing operation of the laser beam printer 300.

The laser beam printer 300 in the present invention employs a printer which has been known well already and this printer utilizes an electronically photographic technique method. In this laser beam printer 300, the toner images are formed on a surface of a photo-sensitive drum 301 according to three process, namely the electrical charge process, the exposure process, and the development process. These toner images are transferred to a recording paper and after that the toner images are fixed on the recording paper. This recording paper is discharged from the laser beam printer 300 machine outside.

The exposure process in the laser beam printer 300 in the present invention is carried out through a following method. A laser driving circuit 302 in the laser beam printer 300 controls a laser diode 303 to turn-on or turn-off in response to a dot data which is given through the printer controlling apparatus 200. A laser light outputted from the laser diode 303 is gathered to a combination lens 304. The laser light is converted in a light beam form and is exposed against a polygonal mirror 305. According to the rotation the polygonal mirror 305 by a motor 306, the light beam is biased and is made to scan on the surface of the photo-sensitive drum 301.

Figure 1:
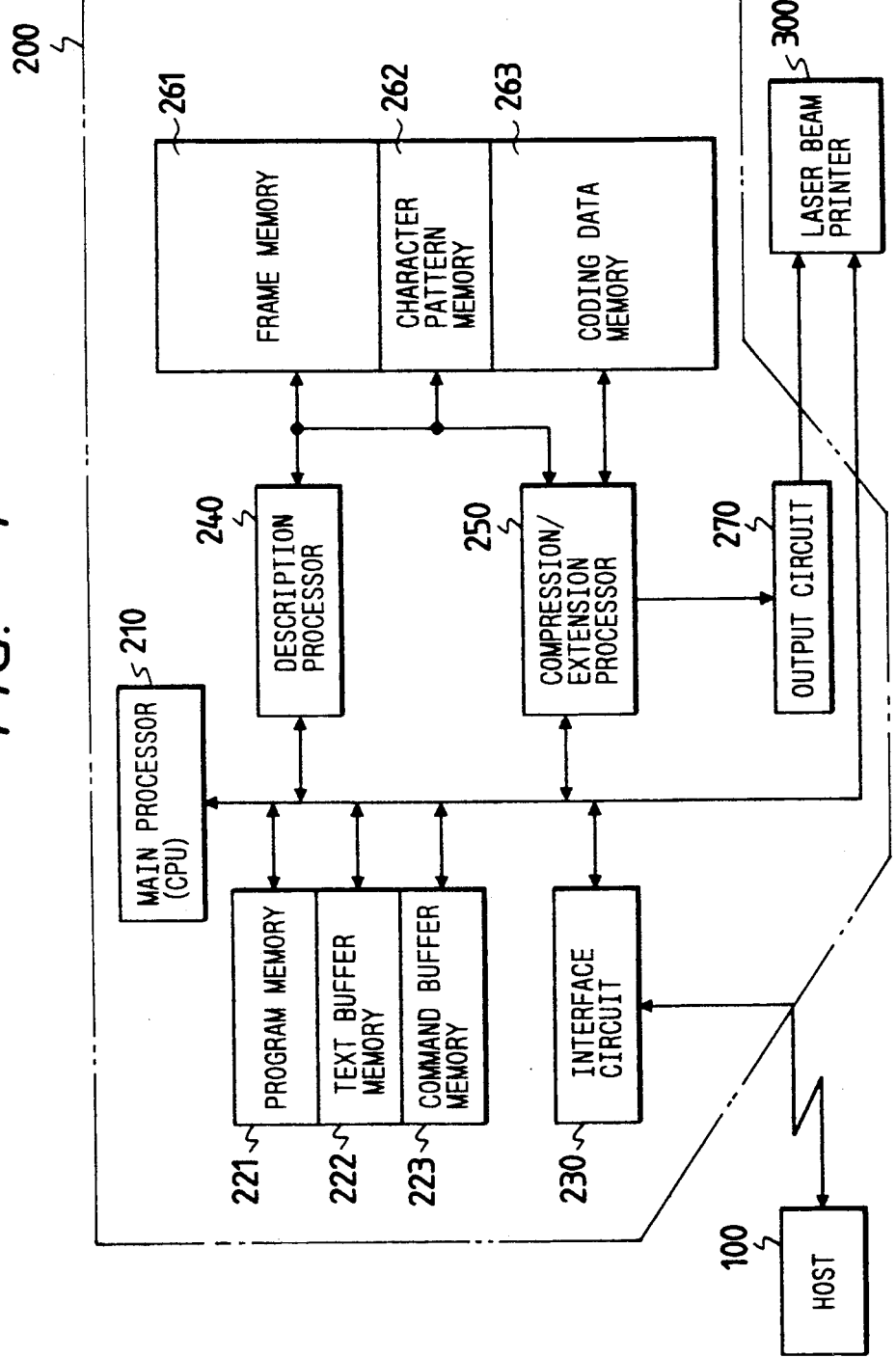
FIG. 1 is a block diagram showing one embodiment of a printer controlling apparatus according to the present invention.

FIG. 1 is a block diagram showing the detail construction of the printer controlling apparatus 200 according to the present invention. The printer controlling apparatus 200 comprises mainly a program memory 221, a text buffer memory 222, a command buffer memory 223, an interface circuit 230, a description processor 240, a compression/extension processor 250, a frame memory 261, a character pattern memory 262, an encoded data memory 263, and an output circuit 270.

Each of the program memory 221, the text buffer memory 222, the command buffer memory 223, the interface circuit 230, the description processor 240 and the compression/extension processor 250 is connected to a main processor (CPU) 210, respectively. Each of the frame memory 261, the character pattern memory 262 and the encoded data memory 263 is connected to both the compression/extension processor 250 and the description processor 240, respectively. The output circuit 270 is connected to the compression/extension processor 250.

As the text buffer memory 222, the memory having the store capacity for storing a plural pages part is used, and further as the command buffer memory 223, the memory having the store capacity for storing the description command of one page part is used, respectively. Also as the frame memory 261, the memory having the store capacity for storing the dot data of one page part is used, and further as the encoded data memory 263, the memory having the store capacity for storing the encoded data of the plural pages part is used, respectively.

Incidentally, when the dot data of the usual one page part is encoded, the amount of the encoded data can be compressed about 20% degree. Further, each of these memories may be constituted by allotting through dividing an area of one memory.

The main processor 210 in the printer controlling apparatus 200 receives a text data from the host 100 through the interface circuit 230 and stores the text data into the text buffer memory 222. The main processor 210 converts the text data to be printed to the description command, such a text data is stored in the text buffer memory 222, and the main processor 210 stores temporarily the description command into the command buffer memory 223. Further, the main processor 210 carries out the processing for giving the description command for preparing the text data to be printed.

Figure 3B:
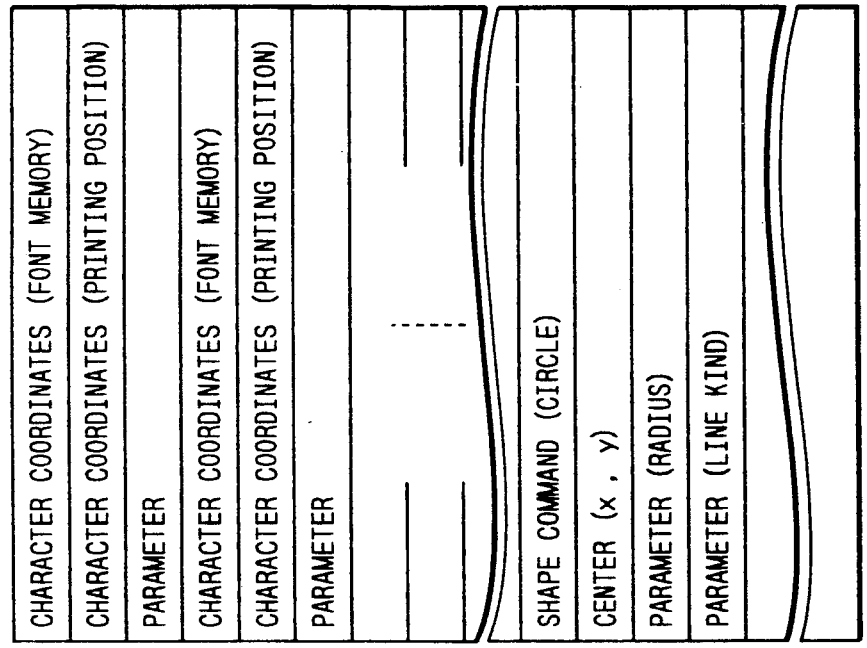
FIG. 3B is a construction view showing a command buffer memory means.
Figure 3A:
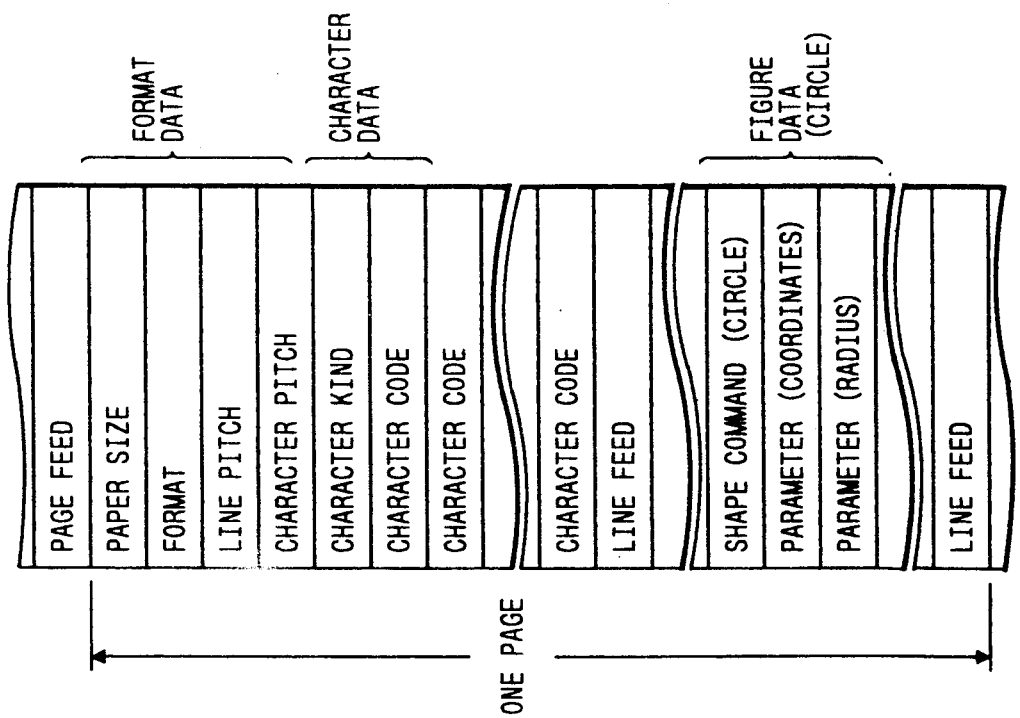
FIG. 3A is a construction view showing a text buffer memory means.

As shown in FIG. 3A, the text data stored in the text buffer memory 222 includes the format data, the character description data and the figure description data with respect to one page, respectively.

The description command stored in the command buffer memory 223 is developed as shown in FIG. 3B. The description command includes the character command, the figure command, the description position, the dimension, and the line kind etc.

The character command within the description command comprises the logic coordinates, the direction and the development position etc., in which the character pattern to be described is stored in the frame memory 261. Further, for example, the figure command includes a circle, the description position includes a central position, and the dimension includes a radius, respectively.

Figure 4:
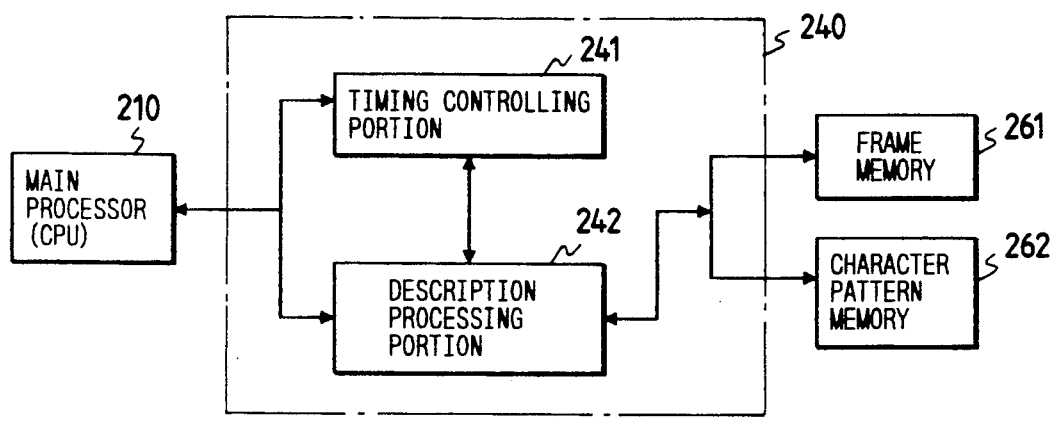
FIG. 4 is a block diagram showing a description processor.
Figure 5:
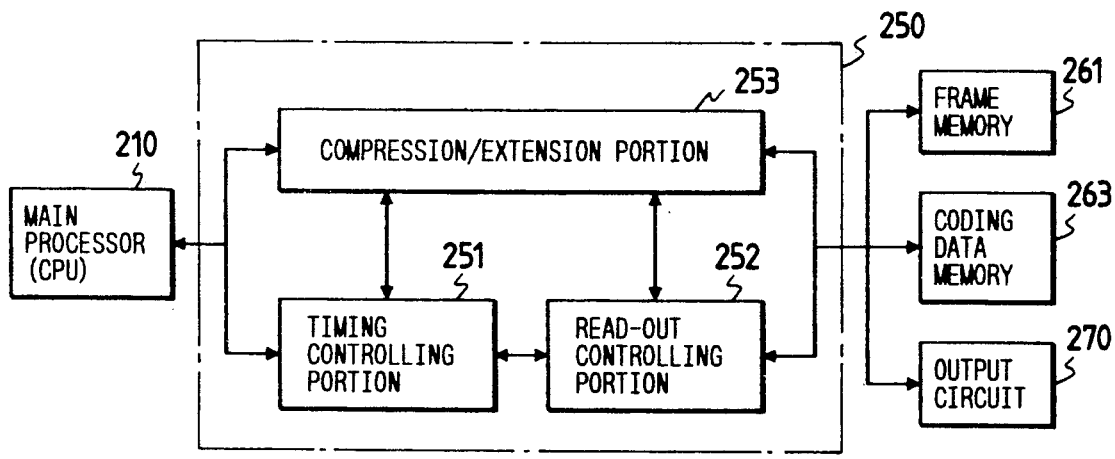
FIG. 5 is a block diagram showing a compression/extension processor.

As shown in FIG. 4, the description processor 240 has a timing controlling portion 241 and a description processing portion 242. Under the control of the main processor 210, the description processor 240 calculates the description command, which is received from the main processor 210, or prepares the dot data referring to the character pattern memory 262 and describes or develops the dot data into the frame memory 261.

Figure 6A:
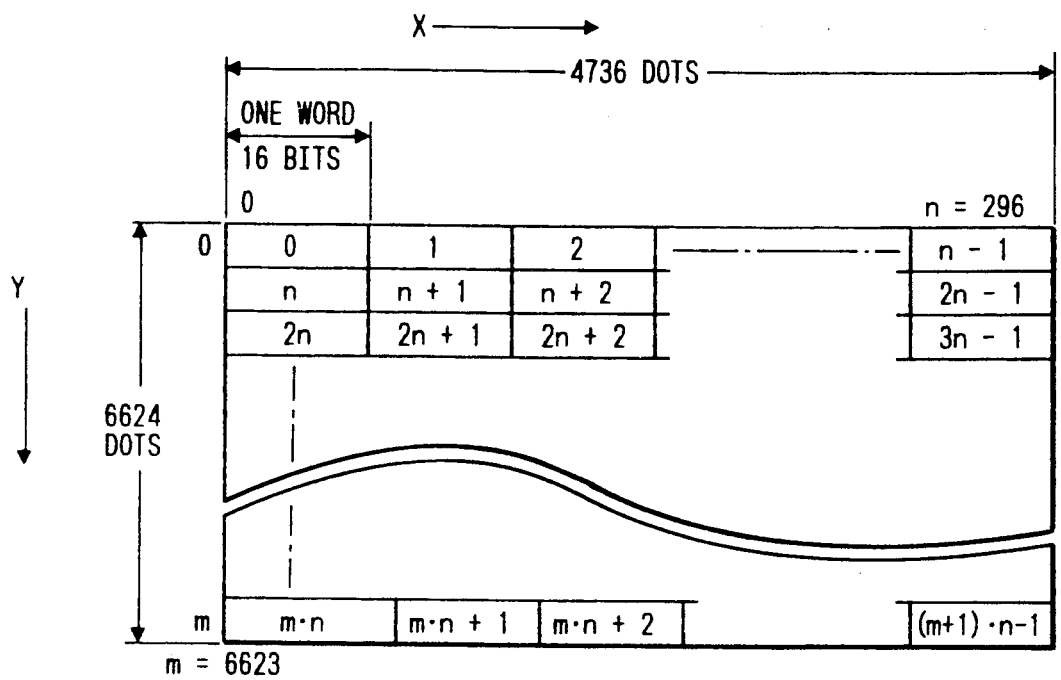
FIG. 6A shows a logic address construction view.
Figure 6B:
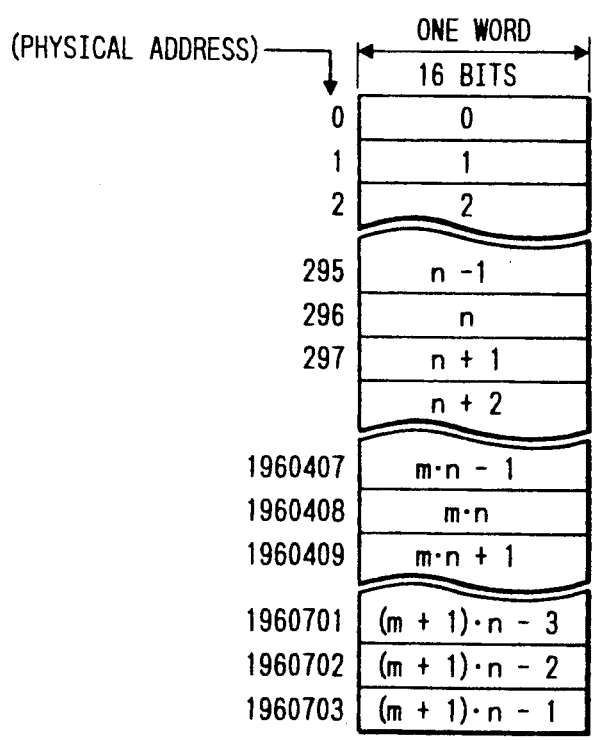
FIG. 6B shows a physic address construction view.

The logic address is an address of two-dimensional (X, Y) arrangement of the printing dot and the physic address is as a memory address on the frame memory circuit. This logic address and this physic address correspond to each other as shown in FIG. 6A and FIG. 6B.

The logic address is indicated by X coordinates, Y coordinates of one dot unit. In this embodiment according to the present invention, with respect to 1 word (16 bit) unit, X coordinates has 4736 bit at the coordinates number $n = 296$ and Y coordinates has 6624 bit at the coordinates number $m = 6623$. The physic address is one-dimensional arrangement of 1 word (16 bit) unit.

Besides, the description command is expressed through the logic address. In this description processing portion 242 for the description of the description processor 240, for example, since the description command for describing the linear figure is given the start point and the end portion of the coordinates on the logic address, the description processing portion 242 calculates the logic address between the start point and the end portion of the coordinates and converts to the physic address and further carries out the processing for describing the description on the frame memory 261.

Figure 7:
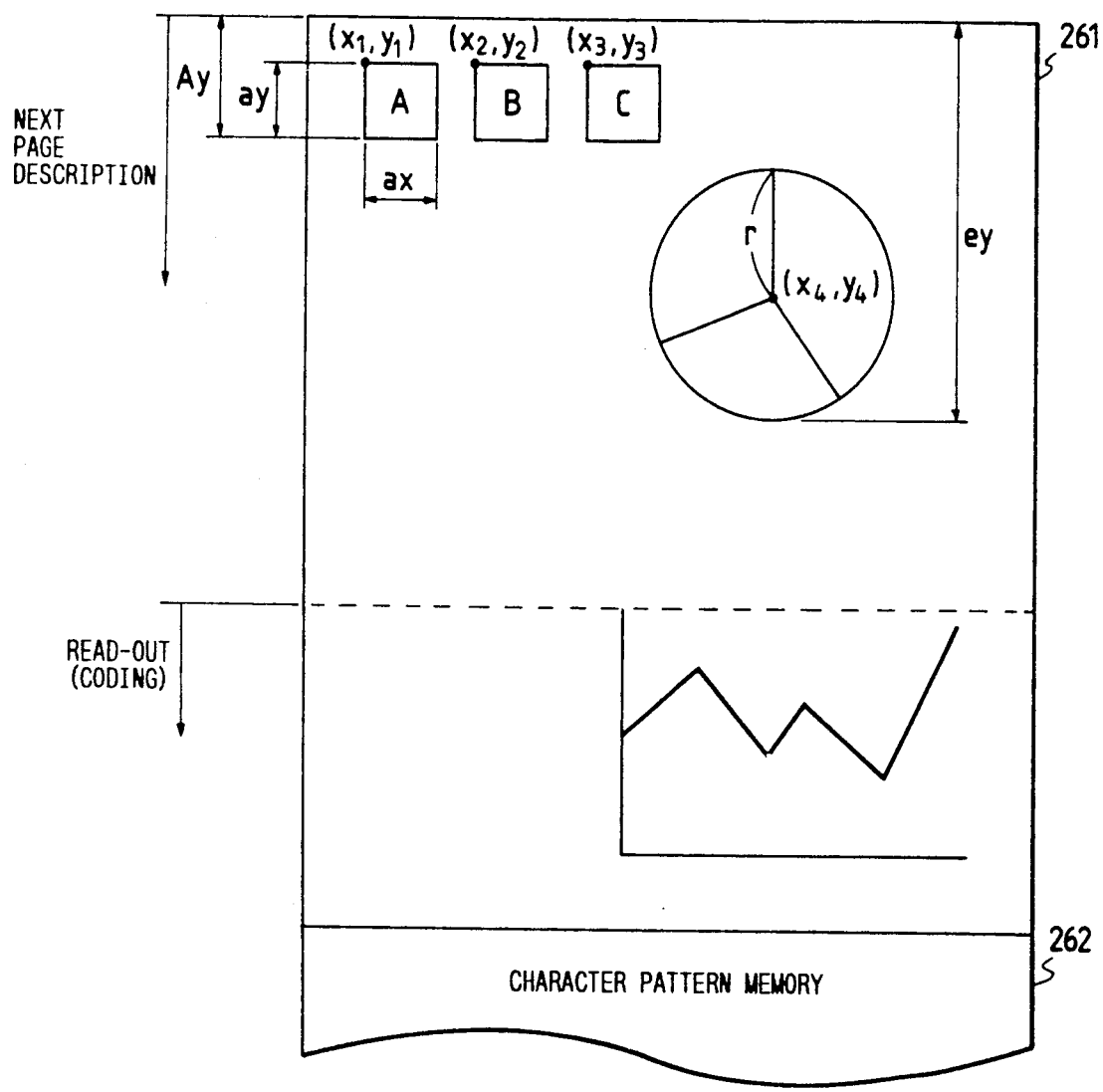
FIG. 7 is a dot data construction view in which a dot data is stored in a frame memory.

FIG. 7 exemplifies the dot data which is described in the frame memory 261.

The character pattern is transferred from the character pattern memory 262. In FIG. 7, ax and ay indicate the size of the character, $x_1$ and $y_1$ indicate the standard coordinates, $x_2$ and $y_2$ indicate the standard coordinates, $x_3$ and $y_3$ indicate the standard coordinates, and Ay indicates the maximum value of the character to be described on Y coordinates, respectively.

Besides, the figure pattern is described through the dot data which is requested in accordance with the figure pattern calculation. In FIG. 7, $x_4$ and $y_4$ indicate the central coordinates of the circle to be described, r indicates the radius of the circle, and ey indicates the maximum value of the figure to be described on Y coordinates, respectively.

The compression/extension processor 250 comprises a timing controlling portion 252, a read-wire controlling portion 252, and a compression/extension processing portion 253.

Under the control of the main processor 210, the compression/extension processor 250 stores the encoded data in an encoded data memory 263. Such an encoded data is obtained by carrying out the coding processing (the coding method for MH, MR, $M^2R$ etc. is given through the main processor 210) for compressing the redundancy degree according to reading out the dot data described in the frame memory 261.

The decoding processing for extending the dot data is carried out through a processing in which the encoded data having one line part being stored in the encoded data memory 263 is read out. And such an obtained dot data is given to the output circuit 270.

In these processing, the compression/extension processing portion 253 carries out the coding processing and the decoding processing. The read-wire controlling portion 252 reads out the dot memory from the frame memory 261 and reads out the coding memory from the encoded data memory 263 so as to process the coding processing.

The read-wire controlling portion 252 carries out to process for storing the processing for the encoded data into the encoded data memory 263 and to process the decoding processing. Further, the read-write controlling portion 252 assists a memory access processing for outputting the dot data being decoded into the output circuit 270. The timing controlling portion 251 takes charges of the timing control for these processing.

The output circuit 270 comprises a line buffer memory 271 and stores up the dot data of one line part into the line buffer memory 271. The above dot data comprises 4736 dots of 0-n-1 on X coordinates of the physic address shown in FIG. 6A, for example, which are given from the compression/extension processor 250. The output circuit 270 outputs the dot data as a video signal in serial in response to the printing motion of the laser beam printer 300.

In the above stated text information processing apparatus construction, the printing control for the text information processing apparatus will be explained by showing one example in which the text data of plural pages part (five pages part) prepared by the host 100 is printed through the laser beam printer 300.

The host 100 gives the signal for requiring the printing and also the text data to be printed of five pages part into the printer controlling apparatus 200. The main processor 210 of the printer controlling apparatus 200 receives the text data through the interface circuit 230 and stores the text data in the text buffer memory 222. The main processor 210 further converts the text data to the description command and stores temporarily the description command in the command buffer memory 223.

This description command is developed to the dot data to be printed. The description processing to be described in the frame memory 261 makes to carry out by the description processor 240.

When the development with respect to the text data of one page part is finished, the main processor 210 makes to carry our the coding processing for compressing the dot data, which is developed in the frame memory 261, through the compression/extension processor 250. The main processor 210 stores the encoded data, which is obtained by the above processing, into the encoded data memory 263.

The encoded data memory 263, as stated above, has a store capacity for storing the encoded data of plural pages part, accordingly within a range of the above memory store capacity the coding processing is carried out prior to the printing page.

Figure 8:
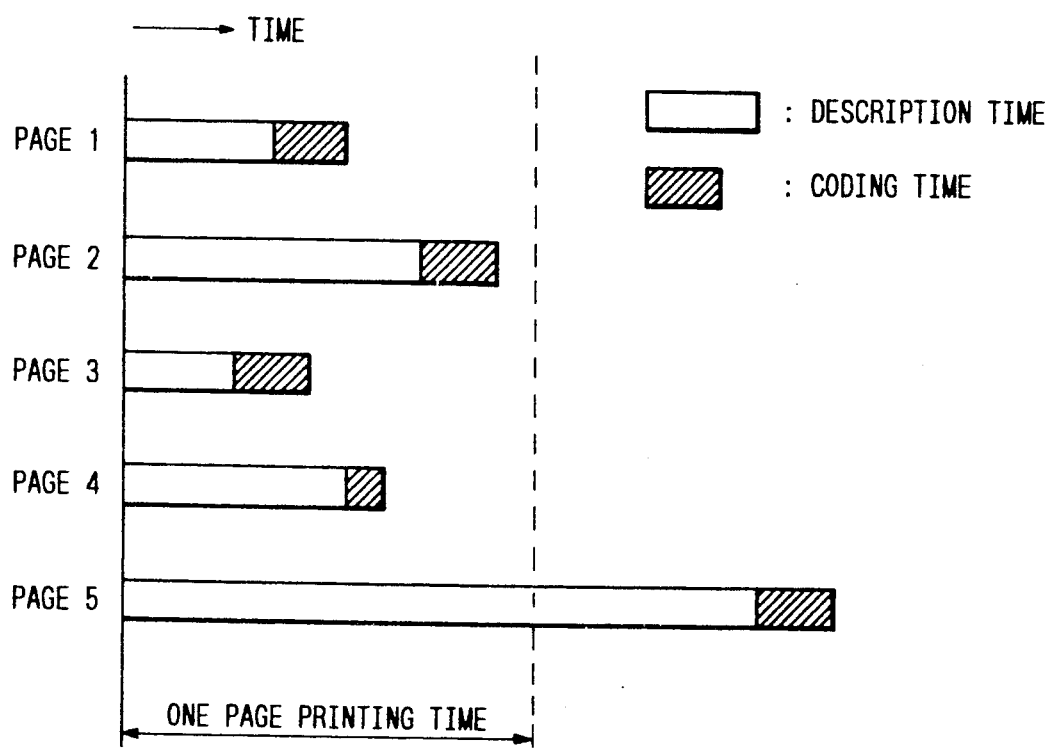
FIG. 8 is a characteristic view showing a necessary description processing time and a necessary coding processing time.

FIG. 8 shows the time required for the description processing with respect to the text data at every page, and further the time required for the coding processing and the time required the printing of the dot data.

The necessary description processing time changes widely between pages according to the contents of the text data, and the difference of among pages of the necessary coding processing time has a small difference between pages according to the contents of the text data, besides the necessary printing time has no difference between pages according to the contents of the text data.

When the description processing and the coding processing with respect to the text data of first page are finished, the main processor 210 carries out the printing motion controlling processing and activates the laser beam printer 300.

And when the laser beam printer 300 becomes the condition operable for the printing motion, in accordance with the printing motion of the laser beam printer 300 the encoded data of one line part each is read out from the encoded data memory 263 and the laser beam printer 300 carries out the decoding processing.

For storing the dot data, which is obtained according to the above stated decoding processing, into the line buffer memory 271 of the output circuit 270, the laser beam printer 300 is controlled through the compression/extension processor 250.

The output circuit 270 synchronizes with the scanning synchronism signal which given through the laser beam printer 300. The output circuit 270 outputs the dot data as the video signal in serial and prints the video signal to the laser beam printer 300.

The main processor 210 of the printer controlling apparatus 200 regulates the whole control of the leaser beam printer 300 so as to carry out the time sharing control in parallel for the above stated description processing, the coding processing and the printing motion controlling processing.

Therefore, according to the above embodiment of the present invention, the printing using the laser beam printer 300 is completed effectively within a short time so as not to give rise the vane empty time in the laser beam printer 300.

FIG. 9A, FIG. 9B and FIG. 9C show the time charts for comparing the text data printing according to the this kind conventional text information processing apparatus and the text data printing according to the text information processing apparatus of the present invention, respectively. In these figures, it assumes that each of the necessary description processing time at every page and the necessary printing time at every page has at the same time.

FIG. 9A and FIG. 9B show the first example and the second example of the text information processing apparatus according to the conventional technique, respectively. FIG. 9C shows an example of the text information processing apparatus according to the present invention.

FIG. 9A shows the first conventional printing system, in which the following motion is carried out repeatedly. Namely, the dot data of one page part is described into the frame memory having one page part data memory store capacity and is printed, after that the printing has been finished, the dot data of next page part is described and is printed. In this first conventional printing system, during the description processing it causes the spare time in the laser beam printer 300.

FIG. 9B shows the second conventional printing system, in which using the frame memory having two pages part data memory store capacity and during the printing of the dot data of one page part, the dot data of next page part is described. In this second conventional printing system, when the necessary description processing time becomes long, it occurs the spare time in the laser beam printer 300.

Besides, FIG. 9C shows the printing system of one embodiment of the laser beam printer according to the present invention. In this printing system according to the present invention, using the memory having substantially two pages part data memory store capacity (the frame memory 261 and the encoded data memory 263), the description processing, the coding processing and the decoding processing and further the printing motion controlling processing are carried out in parallel. Thereby the encoded data of plural pages part is accumulated and is printed with the decoding process or the extending process.

In this printing system of one embodiment of the text information processing apparatus according to the present invention, since the encoded data of plural pages part is accumulated, it has a little chance for occurring the spare time in the laser beam printer 300. The coding processing and the decoding processing are added in the printing system, however since the necessary time for processing these processing is short, it can absorb within the necessary printing time, accordingly there is no occurrence about the spare time in the laser beam printer 300.

In the above stated text information processing apparatus of one embodiment according to the present invention, the text data is read out with one page unit and the description processing and the coding processing are carried out. However, the text data may be read out with 1/n page unit and the description processing and the coding processing are carried out repeatedly. Then by employing the frame memory having less memory store capacity, the high speed printing in the laser beam printer can be carried out.

We claim:

1. In a text information processing apparatus comprising a text data preparation means for preparing a text data including a character description data and a figure description data, a memory means for storing a dot data to be printed, a description means for developing said text data prepared by said text data preparation means to said dot data to be printed and for storing said dot data to be printed into said memory means, and a printer for printing said dot data stored in said memory means, the processing apparatus characterized of further comprising;
a dot data compression means for carrying out a coding processing for compressing a redundancy degree by reading out said dot data to be printed stored in said memory means and for storing said encoded data in said memory means,
an encoded data extension means for reading out said encoded data stored in said memory means from said memory means in response to a printing motion of said printer and for carrying out an extension processing for decoding to said dot data, and
a dot data output means for giving said dot data prepared by said encoded data extension means to said printer.

2. A text information processing apparatus according to claim 1, characterized in that; said dot data output means comprises a line buffer means for storing said dot data outputted from said encoded data extension means and a read-out means for reading out said dot data stored in said line buffer means in synchronize with a printing timing.

3. A text information processing apparatus according to claim 1, characterized in that; said memory means comprises a text data store region for storing said text data, a dot data store means for storing said dot data being developed said text data, and an encoded data store means for storing said encoded data being encoded said dot data.

4. In a text information processing apparatus comprising a text data preparation means for preparing a text data including a character description data and a figure description data, a memory means for storing a dot data to be printed, a description means for developing said text data prepared by said text data preparation means to said dot data to be printed and for storing said dot data to be printed into said memory means, and a printer for printing said dot data stored in said memory means, the processing apparatus characterized of further comprising;
said memory means comprises a text data store region for storing said text data, a dot data store means for storing said dot data being developed said text data, and an encoded data store means for storing said encoded data being encoded said dot data,
a dot data compression means for carrying out a coding processing for compressing a redundancy degree by reading out said dot data to be printed stored in said memory means and for storing said encoded data in said memory means,
an encoded data extension means for reading out said encoded data stored in said memory means from said memory means in response to a printing motion of said printer and for carrying out an extension processing for decoding to said dot data, and
a dot data output means for giving said dot data prepared by said encoded data extension means to said printer, said dot data output means comprises a line buffer means for storing said dot data outputted from said encoded data extension means and a read-out means for reading out said dot data stored in said line buffer means in synchronize with a printing timing.

5. In a text information processing apparatus comprising a text data preparation means for preparing a text data including a character description data and a figure description data, a memory means for storing a dot data to be printed, a description means for developing said text data prepared by said text data preparation means to said dot data to be printed and for storing said dot data to be printed into said memory means, a printer for printing said dot data stored in said memory means, and a control means for controlling these means, the processing apparatus characterized of further comprising;
a description processor for developing said text data of one page part to a dot data to be printed of 1/n page part each under a control of said control means and for storing said dot data into said memory means,
a dot data compression means for carrying out a coding processing for compressing a redundancy degree by reading out said dot data to be printed of 1/n page part stored in said memory means and for storing said encoded data in said memory means,
an encoded data extension means for reading out said encoded data stored in said memory means from said memory means in response to a printing motion of said printer and for carrying out an extension processing for decoding to said dot data,
a dot data output means for giving said dot data prepared by said encoded data extension means to said printer,
an encoded data extension means for reading out said encoded data stored in said memory means from said memory means in response to a printing motion of said printer and for carrying out an extension processing for decoding to said dot data, and a dot data output means for giving said dot data prepared by said encoded data extension means to said printer.

6. A text information processing apparatus according to claim 5, characterized in that; said memory means comprises a text data store region for storing said text data, a dot data store means for storing said dot data of 1/n page part being developed said text data, and an encoded data store means for storing said encoded data of at least one page part being encoded said dot data.

7. In a printing dot signal generating apparatus comprising a description means for developing a text data including a character description data and a figure description data to a dot data and for storing said dot data into a memory means, and a dot data output means for outputting said dot data stored in said memory means, the signal generating apparatus characterized of further comprising;

a dot data compression means for carrying out a coding processing for compressing a redundancy degree by reading out said dot data to be printed stored in said memory means and for storing said encoded data in said memory means, an encoded data extension means from said memory means in response to a printing motion of said printer and for carrying out an extension processing for decoding to said dot data, and a dot data output means for outputting said dot data prepared by said encoded data extension means as a serial dot data.

8. A printing dot signal generating apparatus according to claim 7, characterized in that; said dot data output means comprises a line buffer means for storing said dot data outputted from said encoded data extension means, and a read-out means for reading out said dot data stored in said line buffer means in synchronize with a printing timing.

9. A printing dot signal generating apparatus according to claim 7, characterized in that; said memory means comprises a text data store region for storing said text data, a dot data store means for storing said dot data being developed said text data, and an encoded data store means for storing said encoded data being encoded from said dot data.

10. A printing dot signal generating apparatus according to claim 7, characterized in that; said memory means comprises a text data store region for storing said text data, a dot data store means for storing said dot data of 1/n page part being developed said text data, and an encoded data store means for storing said encoded data of at least one page part being encoded from said dot data.

11. In a printing dot signal generating apparatus comprising a description means for developing a text data including a character description data and a figure description data to a dot data and for storing said dot data into a memory means, and a dot data output means for outputting said dot data stored in said memory means, the signal generating apparatus characterized of further comprising;

said memory means comprises a text data store region for storing said text data, a dot data store means for storing said dot data being developed said text data, and an encoded data store means for storing said encoded data being encoded from said dot data, a dot data compression means for carrying out a coding processing dot compressing a redundancy degree by reading out said dot data to be printed stored in said memory means and for storing said encoded data in said memory means, an encoded data extension means from said memory means in response to a printing motion of said printer and for carrying out an extension processing for decoding to said dot data, and a dot data output means for outputting said dot data prepared by said encoded data extension means as a serial dot data, said dot data output means comprises a line buffer means for storing said dot data outputted from said encoded data extension means, and a read-out means for reading out said dot data stored in said line buffer means in synchronize with a printing timing.

12. In a printing dot signal generating apparatus comprising a description means for developing a text data including a character description data and a figure description data to a dot data and for storing said dot data into a memory means, and a dot data output means for outputting said dot data stored in said memory means, the signal generating apparatus characterized of further comprising:

said memory means comprises a text data store region for storing said text data, a dot data store means for storing said dot data of 1/n page part being developed said text data, and an encoded data store means for storing said encoded data of at least one page part being encoded from said dot data, a dot data compression means for carrying out a coding processing for compressing a redundancy degree by reading out said dot data to be printed stored in said memory means and for storing said encoded data in said memory means, an encoded data extension means from said memory means in response to a printing motion of said printer and for carrying out an extension processing for decoding to said dot data, and a dot output means for outputting said dot data prepared by said encoded data extension means as a serial dot data, said dot data output means comprises a line buffer means for storing said dot data outputted from said encoded data extension means, and a read-out means for reading out said dot data stored in said line buffer means in synchronize with a printing timing.

* * * * *